C. W. DAKE.
CAR SECTION.
APPLICATION FILED JAN. 27, 1915.
1,238,709. Patented Aug. 28, 1917.
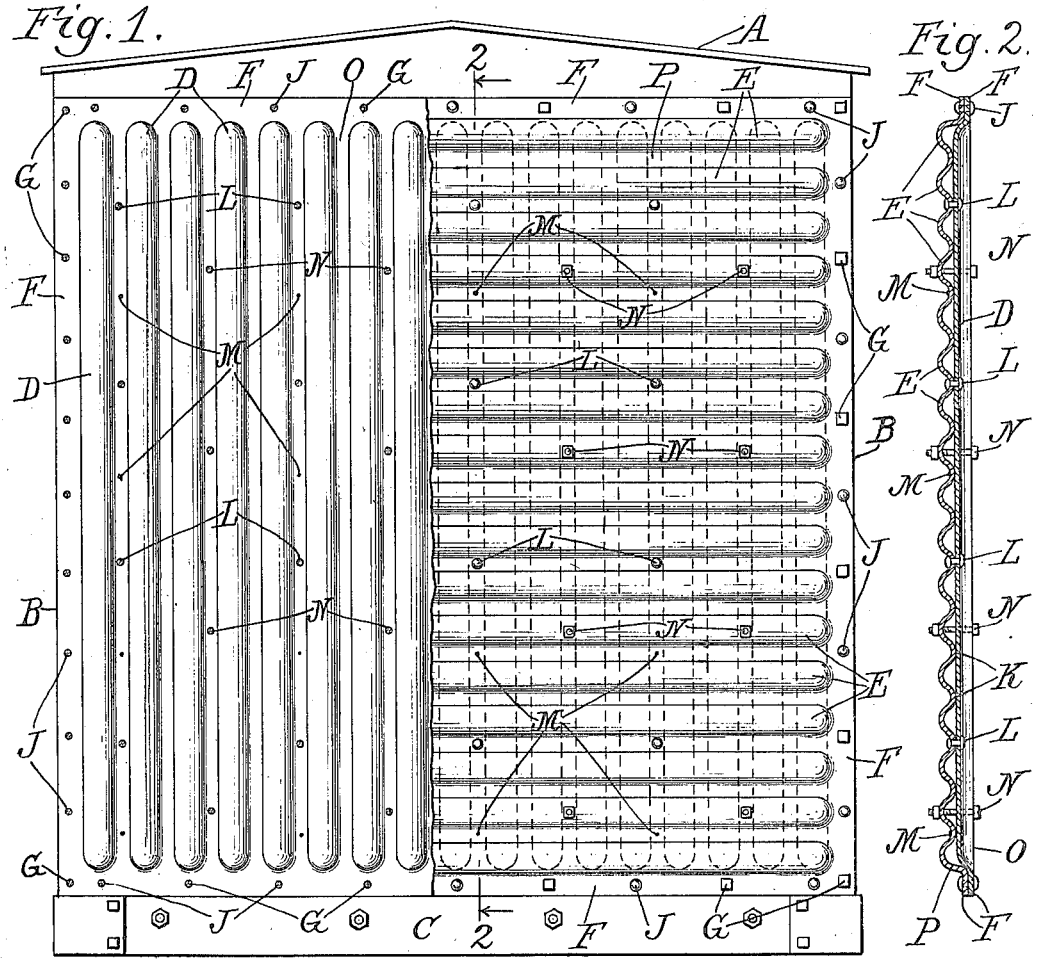
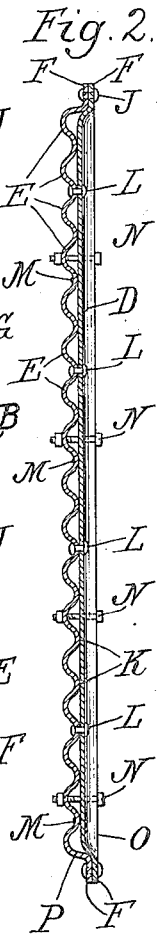
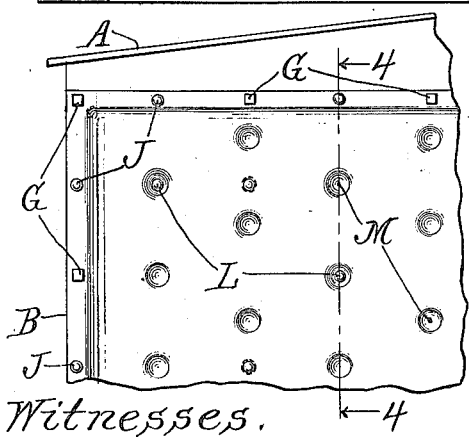
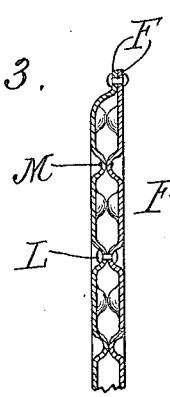
Witnesses.
Edward F. Wray.
Minnie M. Lindeman
Inventor.
Charles W. Dake.
by Parker & Carter
Attorneys.

UNITED STATES PATENT OFFICE.

CHARLES W. DAKE, OF CHICAGO, ILLINOIS, ASSIGNOR TO PYLE-NATIONAL ELECTRIC HEADLIGHT COMPANY, OF CHICAGO, ILLINOIS, A CORPORATION OF NEW JERSEY.

CAR-SECTION.

1,238,709.  Specification of Letters Patent.  Patented Aug. 28, 1917.

Application filed January 27, 1915. Serial No. 4,610.

*To all whom it may concern:*

Be it known that I, CHARLES W. DAKE, a citizen of the United States, residing at Chicago, in the county of Cook and State of Illinois, have invented a certain new and useful Improvement in Car-Sections, of which the following is a specification.

My invention relates to car sections and has for its object to provide a stiffened insulated sheet metal car section adapted to be applied in any desired manner to any kind of car whether having steel or wooden frame.

It is illustrated in the accompanying drawings, wherein—

Figure 1 is an elevation of a car with my car end attached thereto and parts broken away;

Fig. 2 is a vertical section of the same on the line 2—2 of Fig. 1;

Fig. 3 is a detail or elevation of a modification; and

Fig. 4 a vertical section through such detail.

Like parts are indicated by the same letter in all the figures.

A is the car roof, B, B the sides and C the end sill. D, D are corrugations of any desired size, shape or form extending vertically across one of two plates. E, E are similar corrugations extending transversely across the other plate. F, F are the flattened edges of the two plates one of which is preferably dish-shaped toward the other. G, G are a series of bolts or tie rods which may be used to attach the car end to the car frame and J, J are rivets which secure the edges of the plates together. The bolts or tie rods might be used to secure the parts together in lieu of the rivets J, J. K, K are the points of contact between the corrugations, L, L rivets through these points of contact whereby the two plates may be secured together, M, M are points where the two plates have been welded together or attached to each other by some heat process and N, N are bolts whereby the two plates may be attached together, the same passing through the elevated and separated portions of the two plates. O is the plate having the vertical corrugations and P the plate having the horizontal corrugations. In this form of my device the depressions which are pressed in the plates toward each other take the form of continuous depressions, the corrugations or contacting points being at the places where such corrugations cross each other. Obviously the corrugations could be very differently arranged and set at any angle to each other and they might be discontinuous or interrupted.

Either or both plates might be formed in sections and the car end itself could be formed of sections to be brought together in the relation here indicated, proper means being provided to unite the several sections.

In the modified form of the structure shown in Figs. 3 and 4, the depressions are discontinuous and take the form of isolated depressions or nipples. In either case the depressions, nipples or corrugations could be formed on one plate only, but in the preferred form they are on both plates. They are preferably secured together by rivets at their edges and by welding a limited number of the points of contact of the corrugations or nipples. The plates are preferably shaped so as to bring the edges with flat surfaces contiguous to each other in the plane of one of the plates.

I have described my invention as a car end. It will be obvious, however, that except for such arrangements as are made for the attachment of the plate or plates to the car end, the sheet metal structure is equally applicable for any other purpose and particularly for the building up of the sides of cars. I wish, therefore, my expression car end, so far as it applies to the sheet metal structure itself, at least to be understood as relating to and covering sheet metal structures of the kind suitable for car ends or for other purposes.

The use and operation of my invention are as follows:

The car end is insulated because it contains large air spaces. It can be attached in any desired manner by tie rods, bolts or otherwise. It has the truss effect as against pressure from either side. Either side can be placed toward the interior of the car.

As previously stated, I have not indicated any particular method of attaching the end to the car, for that forms no part of the subject matter of this invention. The plates being thus strengthened by contact with each other can be made of very thin metal. I prefer the arrangement of vertical and horizontal corrugations, but as previously suggested about these as well as other features of the invention, a wide latitude is permissible with respect to size, proportion, form and arrangement of the several parts without departing from the spirit of my invention.

In this case we have spoken throughout of car ends, but the invention is equally applicable to other sections or portions of the car, as for instance, car doors or sections of the car sides as the case may be.

I claim:

1. A car section comprising two corrugated plates each with a flat edge surrounding and lying beyond said corrugations, the said plates being placed together, the corrugations of one transverse to those of the other and in engagement therewith, the flat edges of the plates being in engagement with each other, and means for securing the two plates together in such position.

2. A car section comprising two corrugated plates each with a flat edge surrounding and lying beyond said corrugations, the said plates being placed together, the corrugations of one transverse to those of the other and in engagement therewith, the flat edges of the plates being in engagement with each other, and means for securing the two plates together in such position, such edges in substantially the same plane as the plane of one of said plates.

3. A car section comprising two corrugated plates each having a flat edge surrounding and lying outside of said corrugations, the plates being placed together with the corrugations on one plate crossing those on another, and in engagement with them, the flat edges of the plates being in engagement with each other, means for securing the two plates together in such position.

In testimony whereof, I affix my signature in the presence of two witnesses this 23rd day of January, 1915.

CHARLES W. DAKE.

Witnesses:
  BESSIE S. RICE,
  MINNIE M. LINDENAU.